US008637592B2

(12) United States Patent
Jobmann et al.

(10) Patent No.: US 8,637,592 B2
(45) Date of Patent: Jan. 28, 2014

(54) MICROENCAPSULATED RUBBER ADDITIVES AND METHOD FOR PRODUCTION THEREOF

(75) Inventors: Monika Jobmann, Buxtehude (DE); Gerald Rafler, Potzdam (DE); Manfred Hensel, Tostedt (DE)

(73) Assignee: Schill + Seilacher GmbH, Boblingen (DE)

( * ) Notice: Subject to any disclaimer, the term of this patent is extended or adjusted under 35 U.S.C. 154(b) by 750 days.

(21) Appl. No.: 11/996,654

(22) PCT Filed: Jul. 28, 2006

(86) PCT No.: PCT/EP2006/007499
§ 371 (c)(1),
(2), (4) Date: Apr. 3, 2008

(87) PCT Pub. No.: WO2007/012495
PCT Pub. Date: Feb. 1, 2007

(65) Prior Publication Data
US 2008/0227888 A1 Sep. 18, 2008

(30) Foreign Application Priority Data
Jul. 28, 2005 (DE) .................. 10 2005 035 388

(51) Int. Cl.
*C08K 9/00* (2006.01)
*B32B 5/16* (2006.01)
(52) U.S. Cl.
USPC ................. 523/200; 428/402.24; 428/402.21; 427/213.3; 427/213.31
(58) Field of Classification Search
USPC ................... 523/200; 428/402.24, 402.21; 427/213.3, 213.31
See application file for complete search history.

(56) References Cited

U.S. PATENT DOCUMENTS

| 2,623,079 | A | | 12/1952 | Johnson |
| 3,336,155 | A | * | 8/1967 | Rowe ............... 427/212 |
| 4,092,285 | A | | 5/1978 | Leo et al. |
| 4,356,109 | A | | 10/1982 | Saeki et al. |
| 4,396,670 | A | | 8/1983 | Sinclair |
| 4,470,935 | A | * | 9/1984 | Egawa et al. .......... 264/4.7 |
| 4,528,354 | A | | 7/1985 | McDougal |
| 5,141,679 | A | * | 8/1992 | Nakamura et al. ...... 264/4.7 |
| 5,503,781 | A | * | 4/1996 | Sumii et al. .......... 264/4.7 |
| 6,187,439 | B1 | | 2/2001 | Elwakil |
| 7,767,749 | B2 | * | 8/2010 | Wilson, III ............ 524/525 |
| 7,947,370 | B2 | * | 5/2011 | Jobmann et al. ......... 428/402.2 |
| 2002/0065148 | A1 | | 5/2002 | Yokota et al. |
| 2003/0165682 | A1 | | 9/2003 | Menting et al. |
| 2006/0127668 | A1 | * | 6/2006 | Jobmann et al. ........... 428/403 |

FOREIGN PATENT DOCUMENTS

| CH | 564 370 A | 7/1975 |
| DE | 31 14035 C2 | 2/1982 |
| DE | 40 13 005 A1 | 10/1991 |
| DE | 197 27 848 A1 | 1/1999 |
| DE | 197 54 341 A1 | 7/1999 |
| DE | 197 54 342 A1 | 8/1999 |
| DE | 199 23 202 B4 | 11/2000 |
| DE | 102 41 942 A1 | 3/2004 |
| EP | 0 653 444 A2 | 5/1995 |
| EP | 1 118 382 B1 | 4/2003 |
| FR | 2 603 273 A1 | 3/1988 |
| JP | 52-069455 A | 6/1977 |
| JP | 2002-226635 A | 8/2002 |
| KR | 2001-0032468 | 4/2001 |
| WO | WO 93/23795 A1 | 11/1993 |
| WO | WO 99/27012 A1 | 6/1999 |
| WO | WO 99/27013 A1 | 6/1999 |
| WO | WO 2004/024313 A1 | 3/2004 |

OTHER PUBLICATIONS

Finch et al., "Microencapsulation," *Ullmann's Encyclopedia of Industrial Chemistry* (2001, electronic release).
Jobmann et al., "Controlled release systems of biodegradable polymers 6th Communication: Control of particle size and size distribution of microparticles produced by the solvent evaporation technique," *Pharm. Ind.*, 60(11): 979-982 (1998).
International Search Report dated Feb. 12, 2004 for PCT/EP2003/009825.
Examination Report dated Jul. 9, 2003 in German Patent Application No. 10241942.3.
Examination Report dated Mar. 17, 2005 in German Patent Application No. 10241942.3.
Examination Report dated Nov. 27, 2008 in Korean Patent Application No. 10-2005-7004146.
Examination Report dated Jul. 17, 2009 in Japanese Patent Application No. 2004-535429.
Examination Report dated Nov. 26, 2009 in Japanese Patent Application No. 2004-535429.
Sugawara, "Bloom Stabilised Rubber Composition Contain Sulphur Microencapsulation Thermoplastic Resin," Database WPI Week 197729, Derwent Publications Ltd., London, GB (XP-002401482).

* cited by examiner

*Primary Examiner* — Hannah Pak
(74) *Attorney, Agent, or Firm* — Leydig, Voit & Mayer, Ltd.

(57) ABSTRACT

The invention relates to encapsulated rubber additives in the form of microcapsules having a polymer capsule wall and a core which comprises at least one rubber additive. The invention likewise relates to a method for the production of microcapsules of this type. The microcapsules according to the invention are used during vulcanization of natural and synthetic rubbers.

37 Claims, No Drawings

MICROENCAPSULATED RUBBER ADDITIVES AND METHOD FOR PRODUCTION THEREOF

CROSS-REFERENCE TO RELATED APPLICATIONS

This patent application is the U.S. national phase of International Application No. PCT/EP2006/007499, filed on Jul. 28, 2006, which claims the benefit of German Patent Application No. 10 2005 035 388.6, filed Jul. 28, 2005, the disclosures of which are incorporated by reference.

The invention relates to encapsulated rubber additives in the form of microcapsules having a polymer capsule wall and a core comprising at least one rubber additive. The invention likewise relates to a method for the production of microcapsules of this type. The microcapsules according to the invention are used during vulcanisation of natural and synthetic rubbers.

Preferably sulphur is used to cross-link synthetic (diene rubbers) and natural rubbers. Before hot vulcanisation, the sulphur together with fillers and further additives must be well incorporated into the masticated rubber mixture (mechanically and thermally decomposed rubbers) at temperatures up to 110° C. At temperatures of 100° C., sulphur is readily soluble in the rubber mixture; during cooling of the mixture, undesired demixing of the system is however effected due to crystallisation of the sulphur which leads to vulcanisation problems. Storage of the rubber mixture at higher temperatures in order to avoid crystallising-out leads to premature cross-linking and lowering of the product quality in the end products.

The temporal or local availability of reactive or non-reactive additives for plastic materials, e.g. thermoplastics, elastomers or duromers, can be controlled efficiently by encasing or embedding in straight chain or network-forming polymers. Polymer-based microcomposites of this type are known in the form of microcapsules with a core-shell structure or in the form of microscale matrix particles with an extensively homogeneous distribution of the components over the particle cross-section (Ch. A. Finch, R. Bodmeier: "Microencapsulation" in Ullman's Encyclopedia of Industrial Chemistry, $6^{th}$ Ed. 2001 Electronic Release). The core of microcapsules can be present in solid, liquid or gaseous form (hollow balls). In the case of matrix particles, single component and multi-component systems are known.

Methods for producing polymer-based microparticles by means of reactive and non-reactive particle formation processes have been described many times. In the case of reactive particle formation, the formation of the wall or of the matrix is effected in parallel with a polymerisation, polycondensation or polyaddition process. In the case of non-reactive methods, film-forming polymers are used directly, which are brought by a thermodynamic route to phase separation and to particle formation (M. Jobmann, G. Rafler: Pharm. Ind. 60 (1998) 979).

For reactive methods for encapsulation of solid or liquid core materials, melamine formaldehyde resins are used predominantly (DE 199 23 202) but isocyanate/amine systems are also described (AZ 101 56 672). Melamine formaldehyde resins can be used for encasing hydrophobic core materials widely and without difficulty and they can be applied for particle formation from the aqueous phase. Reactive methods require core materials which are inert relative to the wall- or matrix-forming monomers or oligomers, i.e. they do not react with other components which are involved. Apart from the melamine formaldehyde resins, frequently long reaction times are required with these reactive methods (up to 24 h). The microcapsule size can be between 1 and 150 pm dependent upon the reaction conditions (e.g. emulsion addition, dispersion method).

In the case of non-reactive methods, a polymer is converted from solution into a particulate form by dispersion, dropping or spraying processes or via methods which are based on the principle of liquid-liquid phase separation. Dispersion, dropping and spraying methods comprise solvent evaporation; phase separation methods on the other hand are based on the principle of precipitation of the wall material, e.g. by addition of an incompatible component to the polymer solution. What is decisive for the selection of a capsule method is the solubility of the polymer wall or matrix material in an organic solvent and also the compatibility with this solvent of the active ingredient to be encapsulated or embedded.

The properties of microparticulate two- or multi-material systems can be used in various ways in the material field both in the process and material optimisation. Fields of use of this type are for example the temporally or also locally controlled release of reaction components, catalysts, initiators or stabilisers, the simplification of metering- and mixing processes, the protection of sensitive additives from environmental influences or protection of the polymer matrix from undesired contact with the additive or the improvement in compatibility of plastic material additives to the polymer matrix. A precondition for the application of polymer-based microcapsules or matrix particles for process and/or material optimisation is their thermal, mechanical and media stability under the respective technological process or conditions of use which are typical for the material and also the possibility of a controllable or preventable release of the encased or embedded substances.

For use in vulcanisable elastomers, the temporary stability of the microcapsules or matrix particles under formulation conditions in kneaders, calenders or twin-screw extruders at temperatures up to 120° C. and high shearing loads and also their destruction with rapid sulphur release under hot vulcanisation conditions (above 150° C.) is an indispensable precondition.

In DE 197 54 342 A1, sulphur particles encased with various polymer or wax materials are described, said sulphur particles releasing sulphur by melting or dissolving the capsule wall in the rubber mixture at temperatures of 120-140° C. Below the melting temperature of the capsule wall, the capsules are intended to be stable. The small temperature differences between stability and melting or dissolving of the capsule wall are technologically extremely difficult to control in the rubber process as a result of uncontrolled heating due to friction when mixing the highly viscous mixtures. A vulcanisation method using sulphur, which is encapsulated in a stable form under mastication conditions, and release by melting or dissolution of the capsule wall at the only slightly higher temperatures of hot vulcanisation cannot be achieved as a result of the parameter variation being too small.

Straight-chain, thermoplastically deformable polymers or waxes can be applied in general for the microencapsulation of process aids, reaction components or property-modifying additives only in a limited manner since, under compounding and processing conditions of normal polymer materials, they are deformed, dissolved or destroyed. The required melting point differences of at least 40-50° C. can only rarely be achieved for very low softening polymers. More stable capsule walls can only be achieved by using duromer wall materials. Duromer network polymers are unmeltable and the release is effected primarily by thermally activated diffusion of the sulphur which is liquid at these temperatures or also by thermally generated artefacts of the capsule wall through which the liquid sulphur can then escape.

In DE 102 41 942 A1, a method is described for microencapsulation of liquid or ground sulphur, which, by using non-melting melamine resins as capsule wall material in combination with an abrasion-reducing sliding coating, overcomes the mentioned restrictions of previous technical solutions and with which a microencapsulated sulphur is obtained which most extensively corresponds to the requirements of rubber processors, in particular tyre producers. However the sliding coating provides additional components in the rubber mixture, the effects of which on the end product are unknown. As a function of the rubber mixture and the respective application, the materials of the sliding coating which are available to the rubber mixture can restrict or even prevent the application of this developed technical solution.

It was therefore the object of the present invention to provide a polymer-based sulphur formulation for rubber vulcanisation with a high sulphur content, which separates the sulphur under mastication and storage conditions sufficiently from the rubber mixture and releases said sulphur under vulcanisation conditions at a rate coordinated to the process.

This object is achieved by the generic microcapsules having the characterising features of claim 1 and also by the method for producing the microcapsules having the features of claim 18. The further dependent claims reveal advantageous developments. In claim 32, the use of the microcapsules according to the invention is mentioned.

According to the invention, a microcapsule is provided, the particle wall of which comprises an interpenetrating network which is formed from a non-meltable polymer in the form of a reactive resin component and at least one anionic polyelectrolyte component or ionomer component. The capsule core comprises a rubber additive. The capsule wall according to the invention is mechanically and thermally stable under mastication and storage conditions so that the rubber additive is separated from the surrounding rubber mixture and cannot react with the latter. The release of the rubber additive from the microcapsules and hence its capacity to be able to react with the rubber in a cross-linking manner is effected only at higher temperatures, as occur during rubber vulcanisation, the chosen process temperature essentially determining the amount and rate of the release of the rubber additive. Preferably, reactive resin systems are used for the capsule wall as non-melting polymers, in particular melamine formaldehyde or polyurethane or polyurea resins. In the case of polyurea resins, these are formed preferably from diisocyanates and polyfunctional amines.

Preferably, the mentioned polyelectrolyte components and/or ionomer components are anionically substituted polymers. The anionically substituted polymers are thereby preferably selected from the group consisting of homo- and copolymers of acrylic and methacrylic acid, of maleic acid, of vinyl phosphorous acid, of vinyl sulphonic acid, and of styrene phosphonic acid.

A preferred variant provides that the capsule wall of the microcapsules is formed from a melamine formaldehyde resin which is soluble in water and a polyelectrolyte.

A second, likewise preferred variant provides that the capsule wall is formed from a melamine formaldehyde resin which is soluble in an organic solvent and an ionomer.

The capsule core preferably comprises sulphur as rubber additive. The sulphur can thereby be present both in liquid form or in solid form, i.e. as ground sulphur. The encapsulation of liquid sulphur demands operation under pressure for aqueous phases, with organophilic resin/ionomer systems higher-boiling solvents as continuous phase, such as e.g. sulphones, sulphoxides, arylether, ketones or amide solvent.

The sulphur content of the microcapsules is preferably at least 70% by weight, particularly preferred from 80 to 95% by weight.

The geometry of the microcapsules and the size and distribution thereof are a function of the core which contains the rubber additive. Preferably, the average particle size is 1 to 30 μm with contents of the rubber additive of 85 to 98% by weight. For microcapsules which contain for example ground sulphur, the particle parameters are prescribed by geometry, size and distribution of the powder. When encapsulating liquid rubber additives, the particle parameters are a function of the dispersion of the liquid additive in the aqueous or organic phase in which the additive is dispersed.

A further preferred embodiment provides that the microcapsule has a further outer capsule wall or coating. For special, particularly long-term stable masticated rubber mixtures, there can thus be applied on the microcapsules according to the invention an adhesion-reducing or controlled degrading coating comprising a second, structurally different polymer, as described in DE 102 41 942 A1, which is preferably straight-chain, or a layer comprising low-molecular organic or inorganic substances.

The structurally different polymer for the adhesion reduction or controlled separation is thereby selected preferably from the group consisting of polyacrylates, polyacrylonitriles, polyethylene glycols, ethylcelluloses and also starch fatty acid esters and starch carbamates of long-chain isocyanates. There are preferred as low-molecular organic or inorganic substances, waxes, fatty acid derivatives, silicones, siloxanes or silicates.

The application of the sliding or removeable layer is effected for polymer-based secondary coatings as a function of the polymer structure according to known methods of non-reactive encapsulation by coazervation, solvent evaporation, salting-out or spray drying. Low molecular coating agents are applied preferably on an organic solution or aqueous dispersion. Preferably separation of the microcapsules which contain the rubber additive from the encapsulation batch is effected before application of the sliding or removeable layer. Also direct further processing is possible, preferably when spraying processes can be applied.

The particular advantage of the microcapsules according to the invention is based on the fact that, under formulation and processing conditions, as are known from kneaders, calenders or twin-screw extruders, i.e. at temperatures up to 120° C. and preferably up to 140° C., these are thermally and mechanically stable.

According to the invention, a method for the production of the microcapsules is likewise provided. In a first step, at least one rubber additive is hereby dispersed with strong shearing in a solution which contains at least one compound which forms a reactive resin and at least one polyelectrolyte component or ionomer component. In a subsequent step, the addition of a catalyst is then effected or a temperature effect takes place so that the result is the formation of a capsule wall which encloses the rubber additive.

The application of the capsule wall on the rubber additive can thereby be implemented as a batch process, quasi continuously or also continuously in reactors known from prior art and with the known agitation and dispersion technology for encapsulation processes.

In a preferred variant, the component which forms the reaction resin is implemented in the form of a prepolymer, i.e. the reactive resin is produced ex situ. Another preferred variant provides that the reaction resin is formed in a first method step in situ from the compounds which form the reaction resin, i.e. the monomers.

For the formation of the capsule wall, a condensation or addition reaction of the reactive resin component in the presence of the polyelectrolyte component or ionomer component is necessary with formation of a semi-interpenetrating network, the ionic component being bonded into the cross-linked reactive resin. In the case of interpenetrating and semi-interpenetrating networks, no direct chemical bond is effected between the components, rather intertwined polymer chains are involved. These can be catalysed by organic acids, in particular by citric or isophthalic acid, or even inorganic acids, in particular phosphorus, phosphoric or amidosulphonic acid. Organic acids can thereby be used for the wall formation of the organophilic starting components in non-aqueous phases.

The problem of formation of agglomerates in the capsule core can be eliminated in a preferred variant in that the encapsulation is implemented under ultrasonic treatment.

According to the invention, encapsulated rubber additives can be granulated by the addition of known granulation aids or also by means of the secondary coating agent itself. The use of the encapsulated rubber additive in synthetic or natural rubber can be effected by spray-drying or vacuum-drying. Filter dried microcapsules with a residual moisture content of 2%, as are obtained after separation from organic coating agent solution, can be used directly.

Microencapsulated rubber additives are used analogously to non-encapsulated material for rubber vulcanisation. Incorporation of microencapsulated rubber additives is effected according to technologies known from prior art with the apparatus likewise known from prior art. The temporary thermal and mechanical stability of the capsule wall under the specific processing conditions of the rubber formulation is determined by the chemical structure of the polymer network which is formed according to the invention and by the size of the microparticles.

The sulphur-containing microcomposites according to the invention can be mixed without difficulty in rubber mixtures and be distributed even more homogeneously in the mixture than non-encapsulated sulphur.

The efficiency of the mode of operation according to the invention for encasing liquid or ground sulphur and also the stability of the capsule wall under mastication conditions can be determined most reliably by means of the sulphur which crystallises out of vulcanisation-capable rubber mixtures and also by the course of the vulcanisation. Non-encapsulated sulphur or sulphur released too early from the capsules, which dissolves completely in the heated rubber under mastication conditions, is only poorly soluble in the cold rubber mixture and slowly crystallises out. This heterogenisation of the rubber/sulphur system which interferes with the rubber processing in many ways is avoided completely by the use of microencapsulated sulphur produced according to the invention since sulphur encased in this manner forms a separate phase in the rubber mixture and hence is unable to be subjected to dissolution/crystallisation processes.

Rubber mixtures produced in a standard manner revealed first indications of sulphur heterogenisation after 2 h. Rubber mixtures which contained encased sulphur were in contrast stable for longer than 21 d as a function of the wall construction and encapsulation technology and could be further processed and vulcanised without difficulty even after this storage time. The times for the storage stability (established by "blooming behaviour" of the sulphur in the rubber mixture) are a crucial criterion and therefore they are jointly indicated in the examples.

Examination of the blooming behaviour was effected in a practical rubber mixture (SMR 10) with a quantity of sulphur of 5.5 material parts of sulphur relative to 100 material parts of rubber (=phr), the samples of microencapsulated sulphur being used in a quantity which corresponded to 5.5 phr. Further components of the rubber mixture were, as filler, carbon black (Statex N-326), mineral oil plasticiser Sundex 790, as activators, zinc oxide and stearic acid, as ageing protection agents, dimethylbutyl-p-phenylene diamine (6PPD, Vulkanox 4020) and trimethyl dihydroquinoline (TMQ, Vulkanox HS/LG) and as accelerators N,N-dicyclohexyl-2-benzothiazylsulphenamide (DCBS, Vulkacit DZ/EG/C). The formulation components were mixed in a production kneader (Werner & Pfleiderer internal mixer GK 1.5) and the test mixtures were produced with the freshly masticated pre-mixture. Mixing of the sulphur and further formulation components took place under practical mixing conditions. The mixing sequence appeared as follows:

Premastication (commercial pre-mixture)
Internal mixer GK 1.5 N
Start at 60° C.
Mixing time 2 min
Sulphur mixture (premixture, sulphur or microencapsulated sulphur, accelerator)
Internal mixer GK 1.5 N
Start at 60° C.
Mixing time 1.3 min Examination of the cross-linking characteristic was implemented according to DIN 5352 in the rheometer (MDR 2000, Alpha Technologies) at 160° C., the torque (as characteristic for the cross-linkage level) being determined as a function of the time (example):

| Measuring time: 24 min | | |
| --- | --- | --- |
| Sulphur | Non-encapsulated | Encapsulated |
| Torque MS (dNm) | 2.5 | 2.5 |
| Torque MH (dNm) | 19.0 | 18.6 |
| tc 10% (min) | 1.4 | 1.8 |
| tc 90% (min) | 7.8 | 8.3 |
| tc 100% (min) | 14.0 | 14.3 |

The measured value of the maximum torque, i.e. the maximum cross-linkage level MH (also cross-linkage yield) is a first measure for the quantity of sulphur which is available for vulcanisation under the chosen conditions, i.e. in the case of the microencapsulated product samples also for the complete opening of the capsules during vulcanisation. The measured value tc 10% in min is a measure of the start of the cross-linkage (vulcanisation) and in the case of the microencapsulated sulphur also for the timely opening of the capsules during vulcanisation. It was found that the tc-10% is a first indication of the stability of the microencapsulated sulphur in the rubber. Higher tc-10% values (>1.8 min) were found for test mixtures in which the blooming of the sulphur was significantly delayed (>2 weeks). The tc-10% value is jointly indicated in the examples as a characteristic of the stability of the microencapsulated sulphur.

Blooming Behaviour

Assessment of the blooming behaviour was effected visually taking into account two assessment criteria:

blooming behaviour in total, visible by grey-white colourations on the surface of the mixtures blooming behaviour at "activated" places (caused for example by fingerprints—crystallisation centres), visible by white colouration of these places.

The gradation of the blooming was established as follows:

--- no blooming

+ slight blooming (grey-white colouration at a few points)

++ blooming

+++ very pronounced blooming (complete surface coloured grey-white)

In the examples, there is indicated as "stability after rubber incorporation" the time after which still no blooming was observed at non-activated places and slight blooming at activated places.

COMPARATIVE EXAMPLE 1

Single Capsule Wall Comprising Melamine Formaldehyde Resin

In an agitated tank, 96 g finely ground sulphur, 28 g melamine formaldehyde resin (M/F resin) of the PIAMID M 50 type and 16.8 g citric acid are intensively intermixed in 480 ml water with a high performance agitation and dispersion apparatus (ULTRA-TURRAX) at 60° C. The wall formation is terminated after 10 min. For curing, postcondensation takes place for another 120 min with agitation with a low-shearing agitator. The capsules are separated and tested in the filter-moist state for sulphur release and stability in the rubber mixture.

Yield, microencapsulated sulphur filter-moist: 115 g

Extractable sulphur: 3.5%

Stability after rubber incorporation 120 h (tc-10%: 1.63 min)

COMPARATIVE EXAMPLE 2

Double Wall Comprising Melamine Formaldehyde Resin

In an agitated tank, 96 g finely ground sulphur, 28 g melamine formaldehyde resin of the PIAMID M 50 type and 16.0 g isophthalic acid are intensively intermixed in 480 ml water with a high performance agitation and dispersion apparatus (ULTRA-TURRAX) at 60° C. The wall formation is terminated after 10 min. For curing, postcondensation takes place for another 120 min with agitation with a low-shearing agitator. The microcomposites are separated and encapsulated a second time in an analogous manner with 28 g M/F resin in the presence of 16.0 g isophthalic acid in 480 ml water. The capsules are separated and tested in the filter-moist state for sulphur release and stability in the rubber mixture.

Yield, microencapsulated sulphur, filter-moist: 120 g

Extractable sulphur: 0.1%

Stability after rubber incorporation: 275 h (tc-10%: 1.65 min)

COMPARATIVE EXAMPLE 3

Complex Capsule Wall Comprising a Double Casing and Secondary Coating 100 g filter-moist microcomposites with M/F resin double wall produced analogously to example 2, are coated with 20 g paraffin wax dissolved in 0.5 l benzene at 70° C. The coated microcomposites are separated at the coating temperature and air-dried.

Yield, coated microencapsulated sulphur, air-dried: 104 g

Extractable sulphur: 1.2%

Stability after rubber incorporation: 336 h (tc-10%: 1.70 min)

EXAMPLE 1

Single Capsule Wall Comprising Melamine Formaldehyde Resin and Polyethylene-Co-Sodium Maleate In an agitated tank, 96 g finely ground sulphur, 28 g melamine formaldehyde resin (M/F resin) of the PIAMID M 50 type, 0.5 poly(ethylene-co-sodium maleate) (1 ml of a 50% aqueous solution) and 16.8 g citric acid are intensively mixed in 480 ml water with a high performance agitation and dispersion apparatus (ULTRA-TURRAX) at 60° C. The wall formation is terminated after 10 min. For curing, postcondensation takes place for another 120 min with agitation with a low-shearing agitator. The capsules are separated and tested in the filter-moist state for sulphur release and stability in the rubber mixture.

Yield, microencapsulated sulphur, filter-moist: 115 g

Extractable sulphur: 3.0%

Stability after rubber incorporation: 408 h (tc-10%: 1.80 min)

EXAMPLE 2

Single Capsule Wall Comprising Melamine Formaldehyde Resin and Poly(ethylene-co-sodium Maleate) with Melamine Resin Formation in situ In an agitated tank, 13.4 g melamine, suspended in 400 ml water, with 34.7 ml of a 37% solution of formaldehyde are converted in water in the presence of 4.4 ml 10% aqueous NaOH at 70° C. After neutralisation 96 g finely ground sulphur, 0.5 g poly(ethylene-co-sodium maleate) (1 ml of a 50% aqueous solution and 16.8 g citric acid are intensively intermixed with this batch with a high performance agitation and dispersion apparatus (ULTRA-TURRAX) at 60° C. The wall formation is terminated after 10 min. For curing, postcondensation takes place for another 120 min with agitation with a low-shearing agitator. The capsules are separated and tested in the filter-moist state for sulphur release and stability in the rubber mixture.

Yield, microencapsulated sulphur, filter-moist: 115 g

Extractable sulphur: 3.5%

Stability after rubber incorporation: 480 h (tc-10%: 1.83 min)

EXAMPLE 3

Single Capsule Wall Comprising Melamine Formaldehyde Resin and Poly(Styrene-Co-Maleic Acid)

In an agitated tank, 96 g finely ground sulphur, 28 g melamine formaldehyde resin (M/F resin) of the PIAMID M 50 type, poly(styrene-co-maleic anhydride)-hydrolysate (produced from 0.4 g poly(styrene-co-maleic anhydride) and 16.8 g citric acid are intensively intermixed in 480 ml water with a high performance agitation and dispersion apparatus (ULTRA-TURRAX) at 60° C. The wall formation is terminated after 10 min. For curing, post-condensation takes place for another 120 min with agitation with a low-shearing agitator. The capsules are separated and tested in the filter-moist state for sulphur release and stability in the rubber mixture.

Yield, microencapsulated sulphur, filter-moist: 115 g
Extractable sulphur: 3.5%
Stability after rubber incorporation: 396 h (tc—10%: 1.79 min)

EXAMPLE 4

Double Wall Comprising Melamine Formaldehyde Resin and Poly(Ethylene-Co-Sodium Maleate)

In an agitated tank, 96 g finely ground sulphur, 28 g melamine formaldehyde resin (M/F resin) of the PIAMID M 50 type, 0.5 g poly(ethylene-co-sodium maleate (1 ml of a 50% aqueous solution) and 16.8 g citric acid are intensively intermixed in 480 ml water with a high performance agitation and dispersion apparatus (ULTRA-TURRAX) at 60° C. The wall formation is terminated after 10 min. For curing, postcondensation takes place for another 120 min with agitation with a low-shearing agitator. The capsules are separated and encapsulated a second time in an analogous manner with 28 g M/F resin and 0.5 g poly(ethylene-co-sodium maleate) (1 ml of a 50% aqueous solution) in the presence of 16.8 g citric acid in 480 ml water, agitation taking place with an anchor agitator.

The capsules are separated, postcured for 6 h at 110° C. and tested for sulphur release and stability in the rubber mixture (as described in example 1).

Yield, microencapsulated sulphur, filter-moist: 115 g
Extractable sulphur: 0.1%
Stability after rubber incorporation: 504 h (tc-10%: 1.84 min)

EXAMPLE 5

Single Capsule Wall Comprising Melamine Formaldehyde Resin and Poly(Styrene-Co-Maleic Acid), Use of Liquid Sulphur 100 g sulphur are melted at 130° C. and the melt rapidly supplied to a microencapsulation batch, comprising 28 g melamine formaldehyde resin of the PIAMID M 50 type, poly(styrene-co-maleic anhydride)-hydrolysate (produced from 0.4 g poly(styrene-co-maleic anhydride) and 12.0 g isophthalic acid and 480 ml water and intensively intermixed with a high performance agitation and dispersion apparatus (ULTRA-TURRAX) at 90° C. The wall formation around the finely distributed sulphur particles is terminated after 4 min. For curing, postcondensation takes place for another 120 min with agitation with a low-shearing agitator. The capsules are separated and tested for sulphur release and stability in the rubber mixture.

Yield, microencapsulated sulphur, filter-moist: 125 g
Extractable sulphur: not detectable
Stability after rubber incorporation: 384 h (tc-10%: 1.77 min)

EXAMPLE 6

Double Wall Comprising Melamine Formaldehyde Resin and Poly(Styrene-Co-Maleic Acid), Thermal Postcuring In an agitated tank, 96 g finely ground sulphur, 28 g melamine formaldehyde resin (M/F resin) of the PIAMID M 50 type, poly(styrene-co-maleic anhydride)-hydrolysate (produced from 0.4 g poly(styrene-co-maleic anhydride) and 12.0 g isophthalic acid are intensively intermixed in 480 ml water with a high performance agitation and dispersion apparatus (ULTRA-TURRAX) at 60° C. The wall formation is terminated after 10 min. For curing, postcondensation takes place for another 120 min with agitation with a low-shearing agitator. The microcomposites are separated and encapsulated a second time in an analogous manner with 28 g M/F resin and poly(styrene-co-maleic anhydride)-hydrolysate (produced from 0.4 g poly(styrene-co-maleic anhydride) in the presence of 12.0 g isophthalic acid in 480 ml water. The capsules are separated, postcured for 6 h at 110° C. and tested for sulphur release and stability in the rubber mixture.

Yield, microencapsulated sulphur: 110 g
Extractable sulphur: 0.1%
Stability after rubber incorporation: >504 h (tc-10%: 1.96 min)

EXAMPLE 7

Double Wall Comprising Melamine Formaldehyde Resin and Poly(Ethylene-Co-Sodium Maleate), Chemical Postcuring In an agitated tank, 96 g finely ground sulphur, 28 g melamine formaldehyde resin of the PIAMID M 50 type, and 0.5 g poly(ethylene-co-sodium maleate) (1 ml of a 50% aqueous solution) and also 12.0 g isophthalic acid are intensively intermixed in 480 ml water with a high performance agitation and dispersion apparatus (ULTRA-TURRAX) at 60° C. The wall formation is terminated after 10 min. For curing, postcondensation takes place for another 120 min with agitation with a low-shearing agitator. The microcomposites are separated and encapsulated a second time in an analogous manner with 28 g M/F resin and 0.5 g poly(ethylene-co-sodium maleate) (1 ml of a 50% aqueous solution) in the presence of 12.0 g isophthalic acid in 480 ml water. The capsules are separated, postcured in 0.1 m amidosulphonic acid at 60° C. for 1 h and tested for sulphur release and stability in the rubber mixture.

Yield, microencapsulated sulphur, filter-moist: 120 g
Extractable sulphur: not detectable
Stability after rubber incorporation: >504 h (tc-10%: 1.93 min)

EXAMPLE 8

Complex Capsule Wall Comprising a Melamine Resin/Polyelectrolyte Wall and Sliding Layer 100 g filter-moist microcomposites with melamine resin/polyelectrolyte wall, produced analogously to example 1-7, are coated with 20 g calcium stearate dissolved in 0.5 l toluene at 90° C. The coated microcomposites are separated and air-dried at the coating temperature.

Yield, coated microencapsulated sulphur, air-dried: 106 g
Extractable sulphur: not detectable
Stability after rubber incorporation: >504 h (tc-10%: 1.95 min)

EXAMPLE 9

Complex Capsule Wall Comprising Melamine Resin/Polyelectrolyte Wall and Sliding Layer 300 g filter-moist microcomposites with melamine resin/polyelectrolyte wall, produced analogously to example 1-7, are coated with 45 g polyacrylate of the DEGALAN® type, dissolved in 0.5 l acetone, in a spray coater of the GLATT type.

Yield, coated microencapsulated sulphur, air-dried: 310 g
Extractable sulphur: 0.8%
Stability after rubber incorporation: >504 h (tc-10%: 1.96 min)

EXAMPLE 10

Single Capsule Wall Made of Organo-Soluble Melamine Formaldehyde Resin and Poly(Ethylene-Co-Sodium Maleate)

In an agitated tank 96 g finely ground sulphur, 28 g melamine formaldehyde resin of the LAMELITE 200 type, 1.5 g poly(ethylene-co-sodium maleate) (3 ml of a 50% aqueous solution) and 2.0 g amidosulphonic acid are intensively intermixed in 600 ml isopropanol/water mixture (volume proportions 2:1) with a high performance agitation and dispersion apparatus (ULTRA-TURRAX) at boiling temperature. The wall formation is terminated after 10 min. For curing, postcondensation takes place for another 120 min with agitation with a low-shearing agitator. The capsules are separated and tested for sulphur release and stability in the rubber mixture.

Yield, microencapsulated sulphur, filter-moist: 105 g
Extractable sulphur: 0.1%
Stability after rubber incorporation: 396 h (tc-10%: 1.78 min)

EXAMPLE 11

42 l water, 8 l of a 1% poly(ethylene-co-maleic acid) solution and also 7 l of a 2 N citric acid are placed in a reactor equipped with corresponding agitation technology, and heated to 60° C. 7.5 l melamine resin solution are metered into this diluted citric acid/polyelectrolyte solution. After a precondensation time of 5 min, 10 kg ground sulphur are introduced rapidly with intensive mixing with a turbine agitator. The microcomposites are separated and encapsulated a second time in an analogous manner with 7.5 l melamine resin/polyelectrolyte solution in the presence of 7 l of a 2 N citric acid in 50 l water. The capsules are separated and tested in the filter-moist state for sulphur release and stability in the rubber mixture. 11.5 kg of the twice encapsulated sulphur particles are coated in the filter-moist state with 500 g paraffin wax dissolved in 10 l benzene at 70° C. The coated microcomposites are separated at the coating temperature and air-dried.

Yield, coated microencapsulated sulphur, dried: 12.0 kg
Extractable sulphur: 0.2%
Stability after rubber incorporation: >504 h (tc-10%: 1.98 min)

EXAMPLE 12

Analogously to example 5, 10 kg sulphur are melted, microencapsulated twice with M/F resin/poly(styrene-co-maleic anhydride)-hydrolysate, provided with a paraffin wax sliding layer, separated and dried. The capsules are separated and tested for sulphur release and stability in the rubber mixture.

Yield, microencapsulated sulphur, dried: 11.5 kg
Extractable sulphur: not detectable
Stability after rubber incorporation: >504 h (tc-10%: 2.01 min)

The invention claimed is:

1. Microcapsules having a polymer capsule wall and a core which comprises at least one rubber additive, wherein the polymer capsule wall comprises an interpenetrating or semi-interpenetrating network formed between at least one reactive resin component and at least one anionically substituted polymer selected from the group consisting of homo- and copolymers of vinyl phosphorous acid, homopolymers of vinyl sulphonic acid, and homo- and copolymers of styrene phosphonic acid, the reactive resin component being a melamine formaldehyde resin, a polyurea resin, or both.

2. The microcapsules according to claim 1, wherein the polyurea resin is formed from a diisocyanate and polyfunctional amine.

3. The microcapsules according to claim 1, wherein the anionically substituted polymer is selected from the group consisting of the homo- and copolymers of vinyl phosphorous acid and homo- and copolymers of styrene phosphonic acid.

4. The microcapsules according to claim 1, wherein the capsule wall is formed from a melamine formaldehyde resin which is soluble in water and the anionically substituted polymer.

5. The microcapsules according to claim 1, wherein the capsule wall is formed from a melamine formaldehyde resin which is soluble in an organic solvent and the anionically substituted polymer.

6. The microcapsules according to claim 1, wherein the core consists of sulphur.

7. The microcapsules according to claim 6, wherein the sulphur is present in liquid or solid form.

8. The microcapsules according to claim 6, wherein the sulphur content of the microcapsules is at least 70% by weight.

9. The microcapsules according to claim 1, wherein the microcapsules have a further outer capsule wall or coating.

10. The microcapsules according to claim 9, wherein the outer capsule wall or coating consists of at least one straight-chain polymer.

11. The microcapsules according to claim 9, wherein the outer capsule wall or coating consists of at least one low-molecular organic or inorganic substance.

12. The microcapsules according to claim 1, wherein the microcapsules have an average particle diameter of 1 to 30 µm.

13. The microcapsules according to claim 1, wherein the wall thickness of the capsule wall is from 30 to 100 nm.

14. The microcapsules according to claim 1, wherein the microcapsules are thermally and mechanically stable under formulation and processing conditions in kneaders, calenders or twin-screw extruders at temperatures up to 140° C.

15. The microcapsules according to claim 1, wherein the capsule wall dissolves under vulcanisation conditions with release of the rubber additive.

16. A method for the production of microcapsules having a core comprising at least one rubber additive, comprising:
    a) dispersing the at least one rubber additive with shearing in a solution comprising at least one compound which forms a reactive resin and at least one anionically substituted polymer selected from the group consisting of homo- and copolymers of vinyl phosphorous acid, homopolymers of vinyl sulphonic acid, and homo- and copolymers of styrene phosphonic acid, and
    b) forming a capsule wall which encloses the rubber additive by the addition of a catalyst and/or by the effect of temperature, wherein the polymer capsule wall comprises an interpenetrating or semi-interpenetrating network formed between the at least one compound which forms a reactive resin and the at least one anionically substituted polymer, wherein in step a), the compound which forms the reactive resin is a prepolymer.

17. The method according to claim 16, wherein the reactive resin in step a) is formed in situ from the compounds which form the reactive resin.

18. The method according to claim 16, wherein the reactive resin is a melamine formaldehyde resin, a polyurea resin, or both.

19. The method according to claim 18, wherein the polyurea resin is formed from a diisocyanate and a polyfunctional amine.

20. The method according to claim 16, wherein the anionically substituted polymer is selected from the group consisting of the homo- and copolymers of vinyl phosphorous acid and homo- and copolymers of styrene phosphonic acid.

21. The method according to claim 16, wherein in step a), a melamine formaldehyde resin and the anionically substituted polymer are dissolved in an aqueous solution.

22. The method according to claim 16, wherein in step a), a melamine formaldehyde resin and the anionically substituted polymer are dissolved in an organic solvent.

23. The method according to claim 16, wherein the rubber additive is sulphur in liquid or solid form.

24. The method according to claim 16, wherein following the formation of the capsule wall, the latter is cured thermally and/or chemically.

25. The method according to claim 16, wherein a further outer capsule wall or coating is deposited on the microcapsules.

26. The method according to claim 25, wherein the outer capsule wall or coating consists of at least one straight-chain polymer or at least one low-molecular organic or inorganic substance.

27. Microcapsules having a polymer capsule wall and a core which comprises at least one rubber additive, wherein the capsule wall comprises an interpenetrating or semi-interpenetrating network formed between at least one reactive resin component and at least one polyelectrolyte component or ionomer component, the reactive resin component being a polyurea resin;

wherein the polyelectrolyte component or ionomer component is an anionically substituted polymer selected from the group consisting of homo- and copolymers of vinyl phosphorous acid, homopolymers of vinyl sulphonic acid, and homo- and copolymers of styrene phosphonic acid.

28. A method of vulcanizing natural or synthetic rubber comprising utilizing the microcapsules according to claim 1 during the vulcanization.

29. A method of vulcanizing natural or synthetic rubber comprising utilizing the microcapsules according to claim 27 during the vulcanization.

30. The microcapsules according to claim 1, wherein the interpenetrating or semi-interpenetrating network is present in the polymer capsule wall throughout its thickness.

31. Microcapsules having a polymer capsule wall and a core which comprises at least one rubber additive, wherein the polymer capsule wall comprises an interpenetrating or semi-interpenetrating network formed between at least one reactive resin component and an anionically substituted polymer which is poly(styrene-co-sodium maleate), the reactive resin component being a melamine formaldehyde resin, a polyurea resin, or both.

32. The microcapsules according to claim 31, wherein the capsule wall is formed from a melamine formaldehyde resin which is soluble in water and the anionically substituted polymer.

33. The microcapsules according to claim 31, wherein the capsule wall is formed from a melamine formaldehyde resin which is soluble in an organic solvent and the anionically substituted polymer.

34. The microcapsules according to claim 31, wherein the core consists of sulphur.

35. The microcapsules according to claim 34, wherein the sulphur is present in liquid or solid form.

36. A method of vulcanizing natural or synthetic rubber comprising utilizing the microcapsules according to claim 31 during the vulcanization.

37. A method for the production of microcapsules according to claim 31, comprising:
   a) dispersing the at least one rubber additive with strong shearing in a solution comprising at least one compound which forms a reactive resin and the anionically substituted polymer, and
   b) forming a capsule wall which encloses the rubber additive by the addition of a catalyst and/or by the effect of temperature, wherein the polymer capsule wall comprises an interpenetrating or semi-interpenetrating network formed between the reactive resin component and the anionically substituted polymer.

* * * * *

UNITED STATES PATENT AND TRADEMARK OFFICE
CERTIFICATE OF CORRECTION

PATENT NO. : 8,637,592 B2  Page 1 of 1
APPLICATION NO. : 11/996654
DATED : January 28, 2014
INVENTOR(S) : Jobmann et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 958 days.

Signed and Sealed this
Twenty-second Day of September, 2015

Michelle K. Lee
*Director of the United States Patent and Trademark Office*